Feb. 26, 1952     W. H. BELLAH     2,587,432
REEL
Filed July 6, 1949     2 SHEETS—SHEET 1
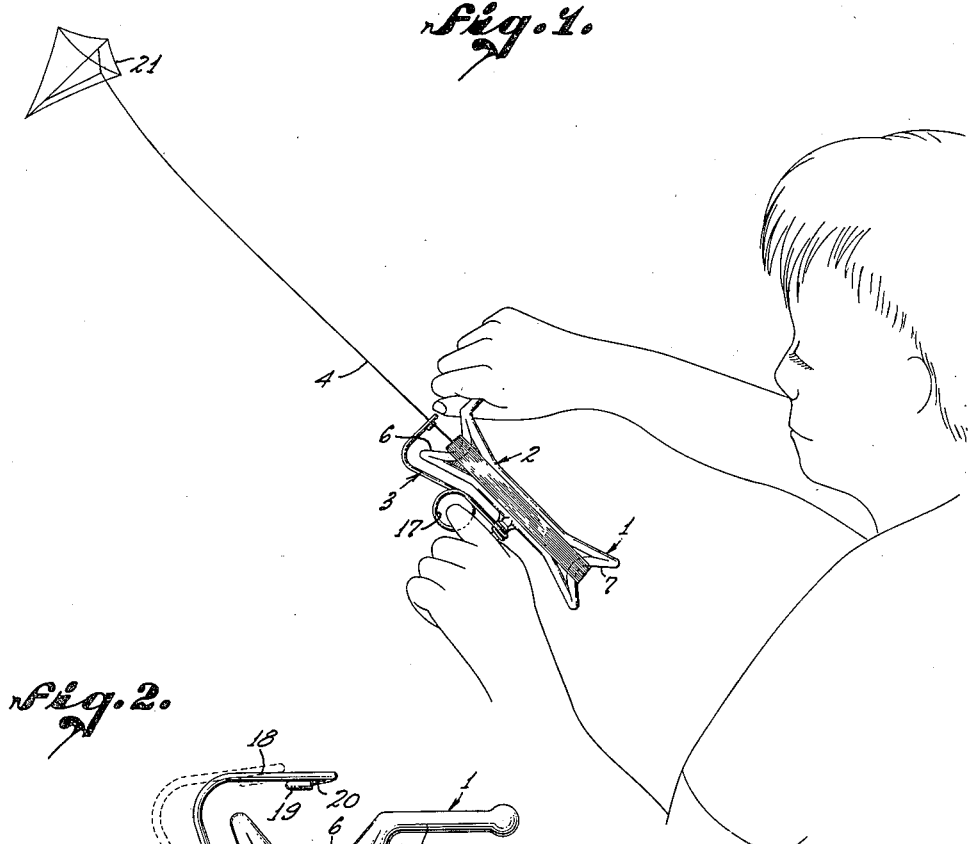
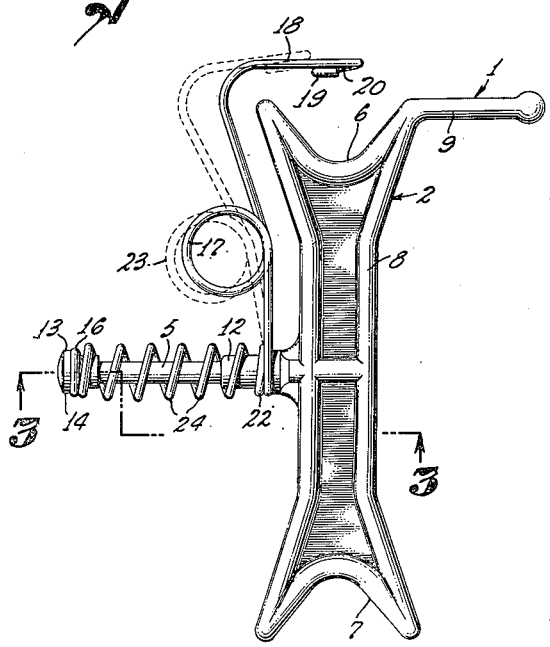
WILLIAM H. BELLAH,
INVENTOR.
BY 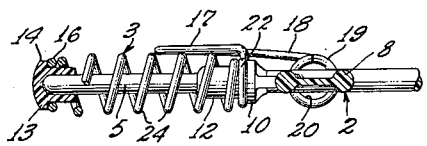
ATTORNEY.

Feb. 26, 1952  W. H. BELLAH  2,587,432
REEL
Filed July 6, 1949  2 SHEETS—SHEET 2
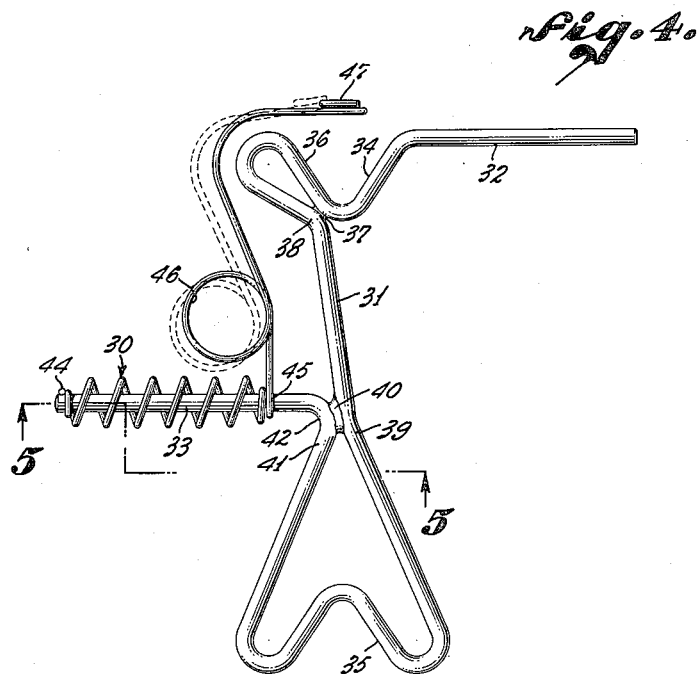
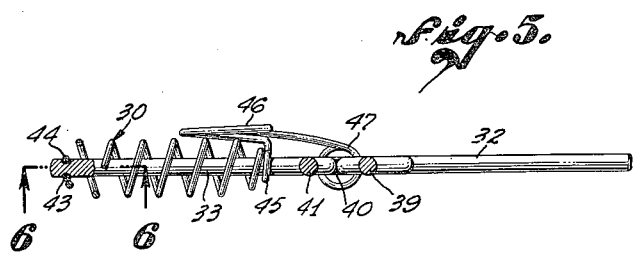
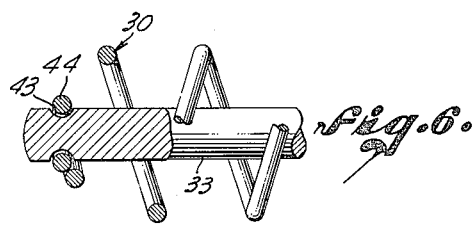
WILLIAM H. BELLAH,
INVENTOR.
BY  W E Beatty
ATTORNEY.

Patented Feb. 26, 1952

2,587,432

UNITED STATES PATENT OFFICE 2,587,432

REEL

William H. Bellah, Burbank, Calif.

Application July 6, 1949, Serial No. 103,197

5 Claims. (Cl. 242—96)

The invention relates to a reel for winding a line such as a kite string, fishing line, yarn or the like.

An object of the invention is to provide a reel having an operating handle for one hand of the operator and another handle having a bearing support for the reel, for the other hand of the operator.

A further object of the invention is to provide a reel having a brake in position to be operated by a finger of the hand supporting the reel.

A further object of the invention is to provide a flexible line guide adapted to be operated either by a finger of the operator or by the incidental lateral sway of the line while being reeled in.

A further object of the invention is to provide a reel of the character described, wherein the handle and bearing support for the reel, the brake and the line guide are a unitary wire member.

For further details of the invention reference may be made to the drawings wherein Fig. 1 is a perspective view of a reel according to the invention, illustrated as employed for a kite string.

Fig. 2 is an enlarged view in elevation of the reel of Fig. 1, the full line showing the combined line guide and brake in one position and the dotted lines showing the same in another position.

Fig. 3 is a sectional view on line 3—3 looking in the direction of the arrows.

Fig. 4 is a front view in elevation of a modified form of reel.

Fig. 5 is a sectional view on line 5—5 of Fig. 4 looking in the direction of the arrows.

Fig. 6 is an enlarged partial sectional view on line 6—6 of Fig. 5 looking in the direction of the arrows.

Referring in detail to the drawings, the reel 1 comprises a reel member 2 and a handle bearing member 3.

The reel member 2 may take various forms and is illustrated in Figs. 1 to 3 as a unitary molding of thermoplastic material. The reel 2 is substantially flat whereby, when the reel is in the position shown in Fig. 2, the line of pull of the kite string 4 is very close to dead center with the reel shaft 5, whereby very little effort is required to resist a strong pull on the kite string 4. The same is true when the reel 2 is rotated 180 degrees. The reel 2 has oppositely extending forks 6 and 7 to receive the kite string 4 or the like. The margin of the body of the reel 2 may have a round bead as illustrated at 8.

Extending from one of the forks such as fork 6 is a handle 9 adapted to be grasped by the hand of the operator, namely, the right hand if a right handed person is operating the reel. Extending from the opposite side of the reel 2 and in the opposite direction is the shaft 5 which is at the center of the reel. The inner end of shaft 5 has a flange 10 which serves as a stop for the inner end of the combined handle and bearing 3. The shaft 5 at its inner end has an enlarged hub 12 for a purpose later described. The outer end of shaft 5 has suitably cemented thereto a cap 13 having a flange 14 which serves as a stop for the outer end 16 of the handle bearing 3. The handle bearing 3 is here shown as a continuous piece of wire which is extended and bent in the form of a circle as illustrated at 17 to form a finger hold, and further extended beyond and in line with the center of the reel 2 as indicated at 18. The outer end of the wire has one or more turns indicated at 19 to form a line guide having a circular opening 20 for the line 4 as shown in Fig. 3.

If one forgets and secures the kite 21 to the line 4 before threading the line 4 through the opening 20, it can nevertheless be threaded into the opening 20 by passing an intermediate portion of it between adjacent ones of the turns 19.

The handle bearing 3 at its inner end has one or more turns 22 which fit the hub 12 with a small tolerance, whereby a braking effort can be applied to the reel by pulling down the finger hold 17, with the forefinger, to the dotted line position shown at 23 in Fig. 2, as this causes the turns 22 to cant and bind, to form a friction drag on the hub 12. The amount of this drag is readily adjustable by the amount of pull exerted on the finger hold 17. Also the deflection of the finger hold 17 as described causes the line guide 19 to shift along the axis of the reel 2 to spread out the line and prevent it from piling up, when reeling in the line. However, in practice it is not necessary to operate the finger hold 17 for this purpose when reeling in, as the kite 21, and more particularly the kite string 4 does not always maintain a position exactly at right angles to the center of the reel 2 and the lateral sway of the kite 21 or the incidental movement of the reel 1 serves to deflect the line guide 19 sufficiently to prevent the line 4 from piling up, when reeling in the line.

Whether the finger hold 17 is operated enough to cause the turns 22 to tilt and function as a brake and/or whether such operation is sufficient to cause the line guide 19 to shift, the finger hold 17 forms part of a handle which is more comfortable to hold than if it were not provided. The major portion of the handle is provided by the enlarged coils 24 intermediate the length of the combined handle and bearing support 3.

In the modification shown in Figs. 4 to 6, the combined handle and bearing 30, brake 45, finger hold 46, and line guide 47 are of a unitary piece of wire, substantially the same as previously described. The reel 31, instead of being a molding as previously described, is here illustrated as a unitary flat wire member which terminates at one end in a handle 32 which projects in one direction at one end of the reel, and terminates at its other end in an oppositely extending shaft 33 at the center of the reel. The wire has forks 34 and 35 to receive the line. The inner branch 36 of the fork 34 is welded or soldered as indicated at 37 to an adjoining portion 38 of the wire, to brace the handle 32. The outer branch 39 of the fork 35 is welded or soldered as indicated at 40 to the other branch 41 where it has a bend 42 to form the shaft 33. The outer end of shaft 33 has an annular groove 43 to rotatably receive the outermost coil 44 of reduced diameter. The inner end of the handle bearing 30 has one or more turns 45 which fit the shaft 33 with a close tolerance so that it can function as a brake when operated by the finger hold 46 as above described.

Various modifications may be made in the invention without departing from the spirit of the following claims.

I claim:

1. A reel having a shaft, said shaft having an inner end at said reel and having an outer end, a unitary wire member having bearing coils therein rotatably supporting the outer end of said shaft and having other bearing coils therein rotatably supporting the inner end of said shaft, a handle intermediate said first and second mentioned bearing coils, said wire member extending from said other bearing coils and having a turn forming a finger hold adapted to be engaged by a finger of the hand on said handle, said finger hold comprising means for tilting said other bearing coils to bind said shaft.

2. A reel comprising a reel member having a shaft and a unitary wire member having therein spaced bearing coils providing spaced bearing supports rotatably supporting said shaft, said wire member having therein handle coils intermediate said spaced bearing coils, a finger hold loop in said wire member and a terminal line guide coil in said wire member for said reel.

3. A reel comprising a reel member having a shaft and a unitary wire member terminating at one end in a line guide for said reel and terminating at its other end in spaced coils rotatably supporting opposite ends of said shaft, said wire member having handle coils intermediate said spaced coils, said spaced coils and said handle coils comprising convolutions of said wire member.

4. A reel according to claim 3, said wire member having an extension arising from and adapted to tilt one of said bearing supports to bind said shaft, and a finger hold on said extension.

5. A reel comprising a reel member having a shaft and a unitary wire member having bearing coils therein and handle coils therein surrounding said shaft and providing a combined handle and bearing support for said shaft, said wire member having an extension arising from one of said bearing coils for tilting its bearing support to bind said shaft and serve as a brake, and a finger hold coil in said extension in position for engagement by the finger of a hand on said handle.

WILLIAM H. BELLAH.

REFERENCES CITED

The following references are of record in the file of this patent:

UNITED STATES PATENTS

| Number | Name | Date |
|--------|------|------|
| 816,328 | Holt | Mar. 27, 1906 |
| 1,014,322 | Molcar | Jan. 9, 1912 |
| 1,249,536 | Sorensen | Dec. 11, 1917 |